UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF NITRIDS.

1,027,312.  Specification of Letters Patent.  Patented May 21, 1912.

No Drawing.  Application filed June 20, 1910. Serial No. 567,927.

*To all whom it may concern:*

Be it known that we, CARL BOSCH, Ph. D., and ALWIN MITTASCH, Ph. D., chemists, subjects, respectively, of the King of Prussia and the King of Saxony, residing at Ludwigshafen-on-the-Rhine, Germany, have invented new and useful Improvements in the Production of Nitrids, of which the following is a specification.

In the specification of British Letters Patent No. 7507 A. D. 1909 is described the production of aluminium nitrid by heating a mixture of alumina or aluminous compounds and carbon in the presence of nitrogen at a temperature not exceeding 2,000° C., and it is stated that of course the addition of materials which hasten the reaction, such as copper, iron, hydrochloric acid, sulfurous acid, or aluminium chlorid, enables the temperature at which the reaction occurs to be reduced. Further, in the specification of British Letters Patent No. 15,641/09 is described the production of compounds containing silicon and nitrogen by heating silica and carbon in the presence of nitrogen and of a metallic compound including compounds of aluminium, and in the specification of the said Letters Patent No. 15,641/09 is given an example according to which China clay is heated with soot in the presence of nitrogen.

We have now discovered that we can advantageously produce mixtures of aluminium nitrid with other nitrids by heating alumina and carbon in the presence of nitrogen and an oxy compound of an element which is also capable of yielding a stable nitrid under the conditions of working.

According to our invention it is possible to effect the production of the mixtures of nitrids aforesaid at comparatively low temperatures, and the reaction can be carried out in a comparatively short time. As examples of oxy compounds which can be added to the alumina according to our invention, we mention silica and the oxids of titanium, zirconium, molybdenum, vanadium, beryllium, cerium, uranium, and chromium, and even small quantities of from 5 to 10 per cent., or even less, are sufficient to produce a favorable result. The presence of alkali compounds or earth alkali compounds, iron oxid, sulfids, and the like, does not adversely affect the course of the reaction, so that compounds containing these substances, either in combination or otherwise, can be employed, thus for instance silicates, titanates, vanadates, and other minerals can be added to the alumina, or naturally occurring mixtures of alumina with any of these compounds, such for instance as bauxite, can be employed. For instance, the naturally occurring bauxite containing silica and titanium oxid (white bauxite) can be treated with carbon and nitrogen and in this case the further addition of oxy compounds according to our invention can be reduced or omitted. Suitable temperatures for carrying out the reaction of this application lie between 1400° and 2,000° C.

The following examples will serve to illustrate further the nature of our invention and how it can be carried into practical effect, but the invention is not confined to these examples. The parts are by weight.

Example 1: Heat together for fifteen hours, at about fifteen hundred degrees centigrade, a mixture of forty-eight parts of anhydrous alumina, twenty-four parts of pure quartz, and twenty-eight parts of coal, while passing a current of nitrogen over the mixture. The resulting product contains aluminium nitrid and silicon nitrid, either in the form of a mixture or as a chemical compound.

Example 2: Mix together sixty parts of anhydrous alumina, fifteen parts of rutile ($TiO_2$), and twenty-five parts of anthracite. Press the mixture into the form of briquets and place them in fire-proof chamotte saggers, and then heat the mixture for twenty hours in the presence of nitrogen at from fourteen hundred, to fourteen hundred and fifty, degrees centigrade. The resulting product contains titanium nitrid and aluminium nitrid, either in the form of a mixture or as a chemical compound.

Example 3: Heat together for five hours, at fifteen hundred and fifty degrees centigrade, seventy parts of bauxite, six parts of chromium oxid, and twenty-four parts of soot, while passing a current of nitrogen over the mixture. The resulting product contains aluminium nitrid together with a little chromium nitrid and silicon nitrid.

Example 4: Heat together, for two hours, at sixteen hundred degrees centigrade, in a current of nitrogen, seventy-four parts of bauxite (containing sixteen per cent. of silica, two per cent. of titanium dioxid, and traces of vanadium and chromium), and twenty-six parts of ground coke. The resulting product contains aluminium nitrid together with some silicon nitrid and small quantities of titanium nitrid, vanadium nitrid and chromium nitrid.

In the above examples, instead of the temperatures given, higher temperatures may be employed, for instance, the mixtures may be heated in an electric furnace.

Now what we claim is:—

1. The process of producing nitrids by heating alumina and carbon in the presence of nitrogen and an oxy compound of an element which is also capable of yielding a stable nitrid under the conditions of working while employing a temperature lying between 1400° and 2,000° C.

2. The process of producing nitrids by heating alumina and carbon in the presence of nitrogen and a small quantity of silica while employing a temperature lying between 1400° and 2,000° C.

3. The process of producing a mixture containing aluminium nitrid and silicon nitrid by heating bauxite containing silica with carbon in the presence of nitrogen while employing a temperature lying between 1400° and 2,000° C.

4. The process of producing nitrids by heating forty-eight parts of alumina and twenty-eight parts of carbon in the presence of nitrogen and of twenty-four parts of quartz, at a temperature of about 1500° C.

In testimony whereof we have hereunto set our hands in the presence of two subscribing witnesses.

CARL BOSCH.
ALWIN MITTASCH.

Witnesses:
JOHN ALEXANDER LLOYD,
ERNEST L. IVES.